(12) United States Patent
Denich et al.

(10) Patent No.: US 12,529,573 B2
(45) Date of Patent: Jan. 20, 2026

(54) DETERMINATION OF TRIP INFORMATION

(71) Applicant: Bayerische Motoren Werke Aktiengesellschaft, Munich (DE)

(72) Inventors: Christian Denich, Munich (DE); Benjamin Quattelbaum, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 245 days.

(21) Appl. No.: 18/263,667

(22) PCT Filed: Feb. 1, 2022

(86) PCT No.: PCT/EP2022/052292
§ 371 (c)(1),
(2) Date: Jul. 31, 2023

(87) PCT Pub. No.: WO2022/189069
PCT Pub. Date: Sep. 15, 2022

(65) Prior Publication Data
US 2024/0068834 A1    Feb. 29, 2024

(30) Foreign Application Priority Data
Mar. 8, 2021   (DE) ..................... 10 2021 105 556.3

(51) Int. Cl.
*G01C 21/36*     (2006.01)
*G01C 21/34*     (2006.01)
(52) U.S. Cl.
CPC ..... *G01C 21/3694* (2013.01); *G01C 21/3446* (2013.01); *G01C 21/3492* (2013.01); *G01C 21/367* (2013.01)

(58) Field of Classification Search
CPC ............ G01C 21/3694; G01C 21/3446; G01C 21/3492; G01C 21/367
See application file for complete search history.

(56) References Cited

U.S. PATENT DOCUMENTS

2008/0071465 A1 *   3/2008   Chapman ........... G01C 21/3691
                                                        701/117
2008/0094250 A1     4/2008   Myr
(Continued)

FOREIGN PATENT DOCUMENTS

DE          10326973 A1    12/2004
DE       102007050154 A1    4/2009
(Continued)

OTHER PUBLICATIONS

English translation of KR 20110025658 A (Year: 2011).*
(Continued)

*Primary Examiner* — Todd Melton
*Assistant Examiner* — Matthew Ho
(74) *Attorney, Agent, or Firm* — Maginot, Moore & Beck LLP

(57) ABSTRACT

A method for determining travel information of a vehicle on a predetermined route includes determining a usual travel time on the route and determining a current travel time on the route on the basis of a current traffic flow on the route. The method further includes determining a predicted travel time on the basis of a traffic flow on the route at the time at which the vehicle is expected to travel on said route. The method also includes providing a deviation of the predicted travel time from the usual travel time and providing a deviation of the predicted travel time from the current travel time.

19 Claims, 2 Drawing Sheets

(56) References Cited

U.S. PATENT DOCUMENTS

| | | | |
|---|---|---|---|
| 2009/0043499 A1 | | 2/2009 | Endo et al. |
| 2012/0215432 A1* | | 8/2012 | Uyeki .............. G08G 1/096838 |
| | | | 701/119 |
| 2023/0123323 A1* | | 4/2023 | Sharifi ............... G01C 21/3484 |
| | | | 701/424 |

FOREIGN PATENT DOCUMENTS

| | | | |
|---|---|---|---|
| DE | 102008024781 A1 | | 12/2009 |
| DE | 102010041583 A1 | | 3/2012 |
| DE | 102012202463 A1 | | 8/2013 |
| DE | 102013000385 A1 | | 7/2014 |
| DE | 102017000373 A1 | | 7/2017 |
| EP | 3319345 A1 | | 5/2018 |
| KR | 20110025658 A | * | 3/2011 |

OTHER PUBLICATIONS

International Search Report corresponding to International Patent Application No. PCT/EP2022/052292, dated Jun. 2, 2022 (4 pages).
Written Opinion corresponding to International Patent Application No. PCT/EP2022/052292, dated Jun. 2, 2022 (6 pages).
German Search Report corresponding to German Patent Application No. 10 2021 105 556.3, dated Dec. 16, 2021. (5 pages).

* cited by examiner

DETERMINATION OF TRIP INFORMATION

The present application is the U.S. national phase of PCT Application PCT/EP2022/052292 filed on Feb. 1, 2022, which claims priority of German patent application No. 10 2021 105 556.3 filed on Mar. 8, 2021, which is incorporated herein by reference in its entirety.

TECHNICAL FIELD

The disclosure relates to the determination of travel information. In particular, the disclosure relates to determining and displaying information that indicates a travel time of a vehicle to a predetermined destination point.

BACKGROUND

A vehicle is equipped with a navigation system that is configured to determine an advantageous route between a current position and a predetermined destination point. A particular travel time usually depends on the traffic flow that can be assumed on the route. If a segment of the route is used by a large number of other vehicles, the traffic flow may be slowed down at that location, and the travel time may be extended accordingly.

To determine a travel time for the vehicle, the traffic flow that prevails at a location on the route at the time at which the vehicle travels on said route is to be used. For example, if a longer route is determined and there is a route segment shortly before the destination at which the traffic flow is very low at times, the vehicle's travel time can be predicted more accurately by taking into account the traffic flow at the location in question not at the time of planning, but at the time the vehicle passes.

Common navigation systems output a predicted travel time and possibly a delay due to reduced traffic flow. The predicted travel time corresponds as closely as possible to the actual travel time, taking into account all delays. However, such an indication may be perceived as inconsistent by a driver if the driver learns from another source, such as traffic news received by radio, of a delay that is some distance along the driver's planned route, or if the driver's own experiences of the traffic volume in the area of the route lead to a different picture. In such a case, the driver may reject a specification or advice from the system without knowing all the information relevant to an optimal route choice.

There is a need, therefore, to provide an improved technique for determining travel information of a vehicle with respect to a traffic flow.

SUMMARY

At least some of the embodiments described herein address the above-stated need as well as others.

According to a first aspect, a method for determining travel information of a vehicle on a predetermined route includes determining a usual travel time on the route and determining a current travel time on the route on the basis of a current traffic flow on the route. The method further includes determining a predicted travel time on the basis of a traffic flow on the route at the time at which the vehicle is expected to travel on said route.

The method also includes providing a deviation of the predicted travel time from the usual travel time and providing a deviation of the predicted travel time from the current travel time.

As used herein, travel information is understood to be information that indicates the travel time that is to be used for a route or a segment of the route. This information may be given in absolute terms or in comparison to another travel time. The travel information may also relate to information from which the travel time may be inferred, or information derived from it. The travel information may in particular comprise the described deviations.

The deviations may be provided in particular to a driver of the vehicle. The determined deviations may constitute information that is easy for the driver to absorb and which is consistent with traffic flow information on the planned route. The given travel information may be improved to match the knowledge level of the driver, for example the driver's local knowledge of the area through which the route passes. The increased consistency may increase a driver's confidence in the information provided by the method, thus making the driver more willing to follow a suggestion.

The driver can be better informed and can better control the vehicle as a function of the information provided. In particular, the driver can make a better decision for or against an alternative route based on the information provided. Travel information for alternative routes may be provided automatically or on request. The deviation of the predicted travel time from the usual travel time may be output for example in the form of an absolute time indication, a relative time indication, or textually. It may be determined in which of a predetermined number of classes the deviation falls, and the determined class may be output. For example, it may be expressed to the driver that the predicted travel time is much shorter, shorter, about the same length, longer, or much longer than a usual travel time. In particular on a route that is traveled by the driver several times, this may be relevant information.

The deviation of the predicted travel time from the current travel time may express a trend in the traffic flow or a delay when traveling the route. It may also be determined in which of several predetermined classes this deviation falls, and the determined class may be output. With respect to a localized traffic obstruction, it is thus possible for example to indicate whether the resulting delay time when traveling the route is strongly increasing, increasing, approximately constant, decreasing, or strongly decreasing. Appropriate threshold values may be used for categorization in each case. Alternatively, the trend of the delays may be specified in other ways, for example numerically, absolutely, or relatively.

The usual travel time on the route is preferably determined with respect to historical information. This information may comprise, in particular, traffic flows on segments of the route at past times. Further preferably, the usual travel time is determined from the historical information with respect to constraints that were comparable at the time. For example, the usual travel time may be determined with respect to a current day of the week, a time of day, or a season. Specific experiences of traveling the route by the vehicle or an assigned driver may also be taken into account.

To determine the current travel time, traffic flows that are valid at the time of determining the travel information are used for the entire route. In other words, it is hypothetically assumed that the vehicle is at any point on the route at the time of determination and is subject to applicable local traffic flows in each case.

The predicted travel time is determined on the basis of an expected development of the traffic flow along the route, along with expected movement of the vehicle along the route. A first segment of the route close to the vehicle may be reached after a short driving time; thus, the traffic flow there is relevant after this brief time. A second segment of the route, still far away from the vehicle, may only be reached after a longer travel time; thus, the expected traffic flow there at the time at which the vehicle travels the segment must be determined for a time further in the future.

It is advantageous to divide the route into route segments, and determine the current traffic flow, the current travel time, and the predicted travel time with respect to one of the route segments. A route segment may for example relate to a road connection between two traffic junctions. Certain travel information and/or information on which the travel information is based may be determined in a more finely granular manner and possibly displayed to a driver or other person on board the vehicle.

The deviations may be provided in each case with respect to the associated segment. In this way, a person can better recognize which delay is currently to be expected on which route segment and which trend this delay is subject to.

It is also advantageous to sum and provide certain deviations with respect to several adjacent route segments. In this way, route segments may be formed for which travel information or information on which this travel information is based may be summarized. In particular, a summary determination may be given for the entire route. It should be noted that the information may be given in parallel in a finely granular manner for single route segments, as well as in a coarser manner for segments of several route segments.

In particular, an indication of a deviation between a usual travel time and a current travel time on one of the route segments may be provided. For example, for a route segment that is known for highly variable traffic flows, such as a highway interchange or a tunnel, it is possible to indicate how much time would currently be lost if said segment were traveled. If the vehicle is actually traveling this route segment, this indication may be directed to when the route segment has been passed by the vehicle. If the route segment is still ahead of the vehicle on the route, the driver can prepare for or adjust to the corresponding delay, depending on the distance of the driver from this route segment.

In yet another embodiment, a graphical representation of the route and an indication of a deviation with respect to a route segment are output at a corresponding segment of the representation. For example, the driver can see at a glance where delays are to be expected along the route, how long corresponding route segments are, and how long the respective delays are. The graphical representation may be provided for example with respect to a geographic map.

In one embodiment, the indication is provided by means of false colors. For example, a scale between blue and red may represent positive and negative deviations in the travel time, respectively. Alternatively, the indication may also be expressed for example by means of a symbol, a text, or as a number.

The representation may comprise a one-dimensional route. For this purpose, the route may be linearized so that it can be rendered as a straight line. The length of the line corresponds to the length of the route. Individual route segments may be displayed with reference to the route at predetermined segments of the line.

The predicted travel time may be determined on the basis of a current traffic flow, an expected traffic flow, and/or a traffic flow determined in the past. In particular, statistical methods may be used for this purpose to determine a prediction that is as accurate as possible.

The expected traffic flow within a predetermined time horizon may be determined by means of Markov chains. The expected traffic flow may correspond to a short-term forecast. The time horizon is usually in the range of minutes or hours. Conditions further in the future may be better determined by means of further statistical methods.

It is further preferred that the predicted travel time is provided for the entire route.

In another embodiment, the route is determined as a function of the predicted travel time. The travel information described herein and information on which the travel information is based cannot be determined until the route has been established. The route may also be redetermined for example at the request of a driver or because a traffic flow develops differently than predicted. A technique described herein may then be re-executed with respect to the modified route.

In a further embodiment, instead of the deviation of the predicted travel time from the usual travel time, an absolute travel time is provided if a person on board the vehicle is familiar with the area. In particular, the person may comprise a driver of the vehicle.

The person's familiarity with the area may be determined based on past movements, and preferably relates to the route, a segment of the route, or an area around the route. For example, if it is known that the person travels the route regularly, the person may be considered to be familiar with the area. The familiarity with the area may be proportional to how frequently the person has traveled the route and/or how recently the person last traveled the route. The familiarity with the area may also be proportional to the number of road segments that the person has traveled that are eligible for alternate routing. The person's knowledge of the area may be quantified in the manner described and compared to a predetermined threshold value in order to determine if the person is familiar with the area.

In yet another embodiment, the familiarity with the area may be determined if a destination point of the person's route is known, particularly if the person has already traveled to or from that point. If, on the other hand, the person has never visited the destination point, the person may be considered to be unfamiliar with the area. The same may apply to a route or route segment that has been traveled or never traveled.

In a further embodiment, the absolute indication may also be provided in addition to the deviation. The deviation of the predicted travel time from the current travel time may also not be provided when the knowledge of the area is taken into account. Steps to determine this deviation may be omitted.

This allows for a targeted determination of what information is most relevant to the person in deciding between different routes. The most relevant information may be provided, while other information may be withheld. The relative and/or absolute indication may be provided together with a current trend.

For example, a commuter on a normal commuting route may be given a preferred indication of whether an increased or reduced volume of traffic or a longer or shorter travel time is to be expected on the route ahead. Since the person has knowledge of the area and can independently evaluate alternative routes, the relative deviation of the travel time is valuable information.

In addition, it may be determined which particular travel information appears to be inconsistent with a person's knowledge of the area or point information, and this information may also be provided. This may comprise for example a predicted development of a traffic obstruction some distance along the route. The person's confidence in the technique presented herein may thus be enhanced.

If, on the other hand, the person is traveling through an area that is less well known to the person, the relative indication of the specific travel time compared to a usual one may be of little help to the person. It is possible to determine whether or not the person knows the area for example by looking at a large number of past trips. The person's behavior may be learned in order to recognize information relevant to the person.

According to a second aspect, an apparatus for determining travel information of a vehicle on a predetermined route relates to a processing device and an output device. The processing device is configured to determine a usual travel time on the route, to determine a current travel time on the route on the basis of a current traffic flow on the route, and to determine a predicted travel time on the basis of a traffic flow on the route at the time at which the vehicle is expected to travel said route. The output device is configured to provide a deviation of the predicted travel time from the usual travel time, and a deviation of the predicted travel time from the current travel time.

The processing device may be configured to carry out all or part of a method described herein. For this purpose, the processing device may comprise a programmable microcomputer or microcontroller, and the method may be available in the form of a computer program product having programming code means. The computer program product may also be stored on a computer-readable data carrier. Features or advantages of the method may be transferred to the apparatus, or vice-versa.

Information required by the processing device to determine the above data may be available locally or obtained externally by means of a wireless communication interface. In particular, the device may comprise a device for determining a current position, and a device for determining a predetermined target position, wherein the processing device is configured to determine the route on the basis of the current position and the target position. In particular, the determination may be performed with respect to a road map and/or taking into account a traffic flow in an area between the current position and the target position.

According to yet another aspect, a vehicle comprises an apparatus having the capabilities discussed above.

BRIEF DESCRIPTION OF THE DRAWINGS

The present disclosure will now be described in greater detail with reference to the attached drawings, in which:

FIG. 1 shows a route 100 and a vehicle 105 comprising an apparatus 110. The route 100 extends between a starting point 115 and a destination point 120 via two exemplary intermediate points 125, resulting in three different route segments 130. The route 100 is determined on a road network, and each route segment 130 comprises one or several segments of a road.

Figure 1:
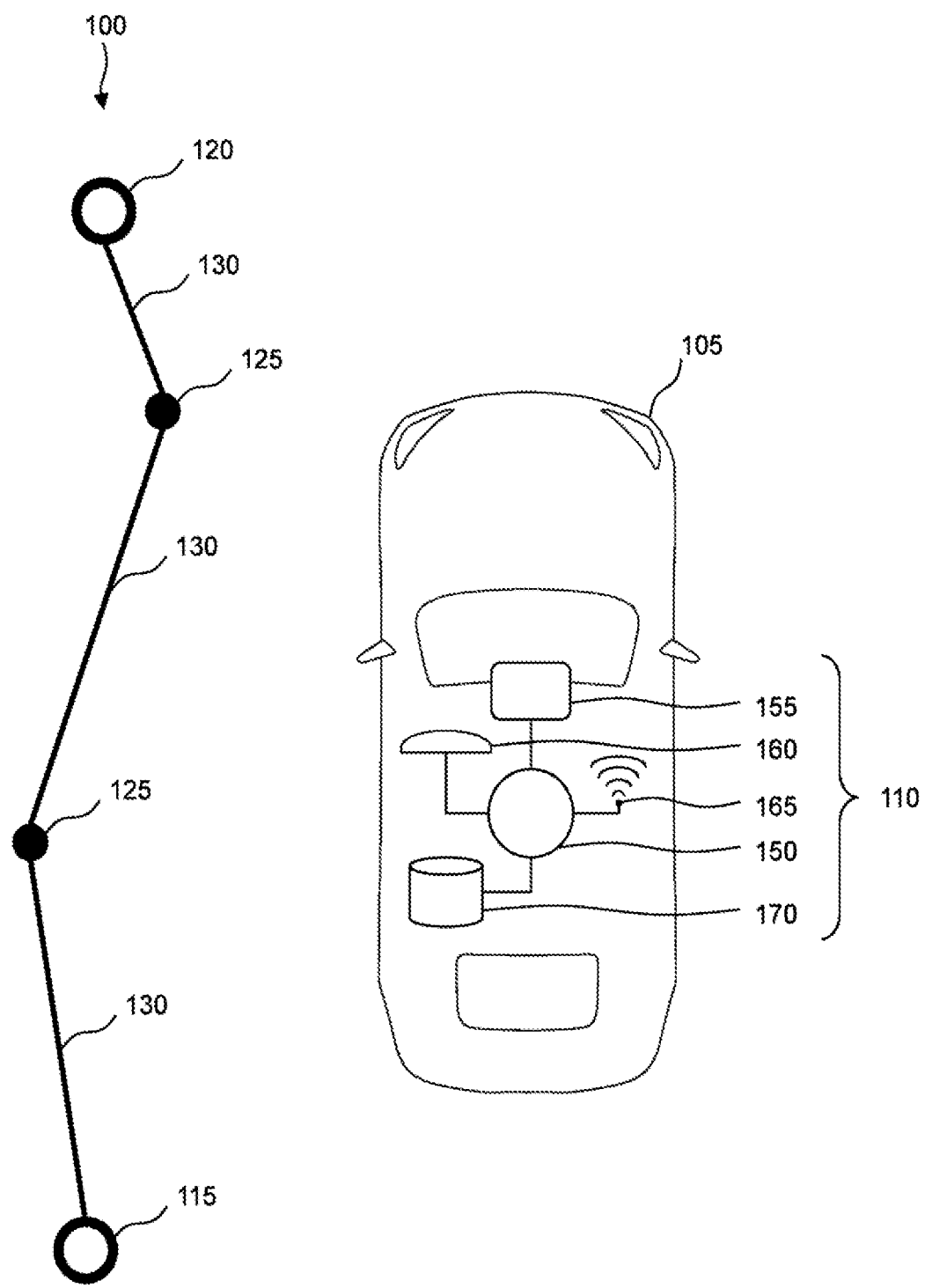
FIG. 1 shows a vehicle and a route to be traveled by the vehicle.

Preferably, the vehicle 105 comprises a motor vehicle, in particular a passenger car, a motorcycle, a truck, or a bus. The apparatus 110 comprises a processing device 150 and an output device 155 which may in particular be configured optically. Several output devices 155 may also be provided, which may for example be configured as a console display, head-up display, or multifunction display. A voice output is also possible. In one embodiment, the output device 155 also comprises an input device, for example in the form of a touch-sensitive screen, for controlling the apparatus 110.

Optionally, a positioning device 160 may also be provided that is configured to determine a geographic position of the vehicle 105. In particular, the positioning device 160 may comprise a receiver for a radio navigation system that may further preferably be satellite-based.

Further optionally, a wireless communication interface 165 may be provided to make contact with an external device such as a server or service in a cloud. In particular, information about current, past, or future traffic flows or information derived therefrom may be requested and received via the communication interface 165.

Further optionally, a map memory 170 is provided, which may in particular contain map information about a road network including roads on the basis of which the route 100 may be formed. Determining a route between a starting point 115 and a destination point 120 is generally known and is assumed for the presently described technique.

Figure 2:
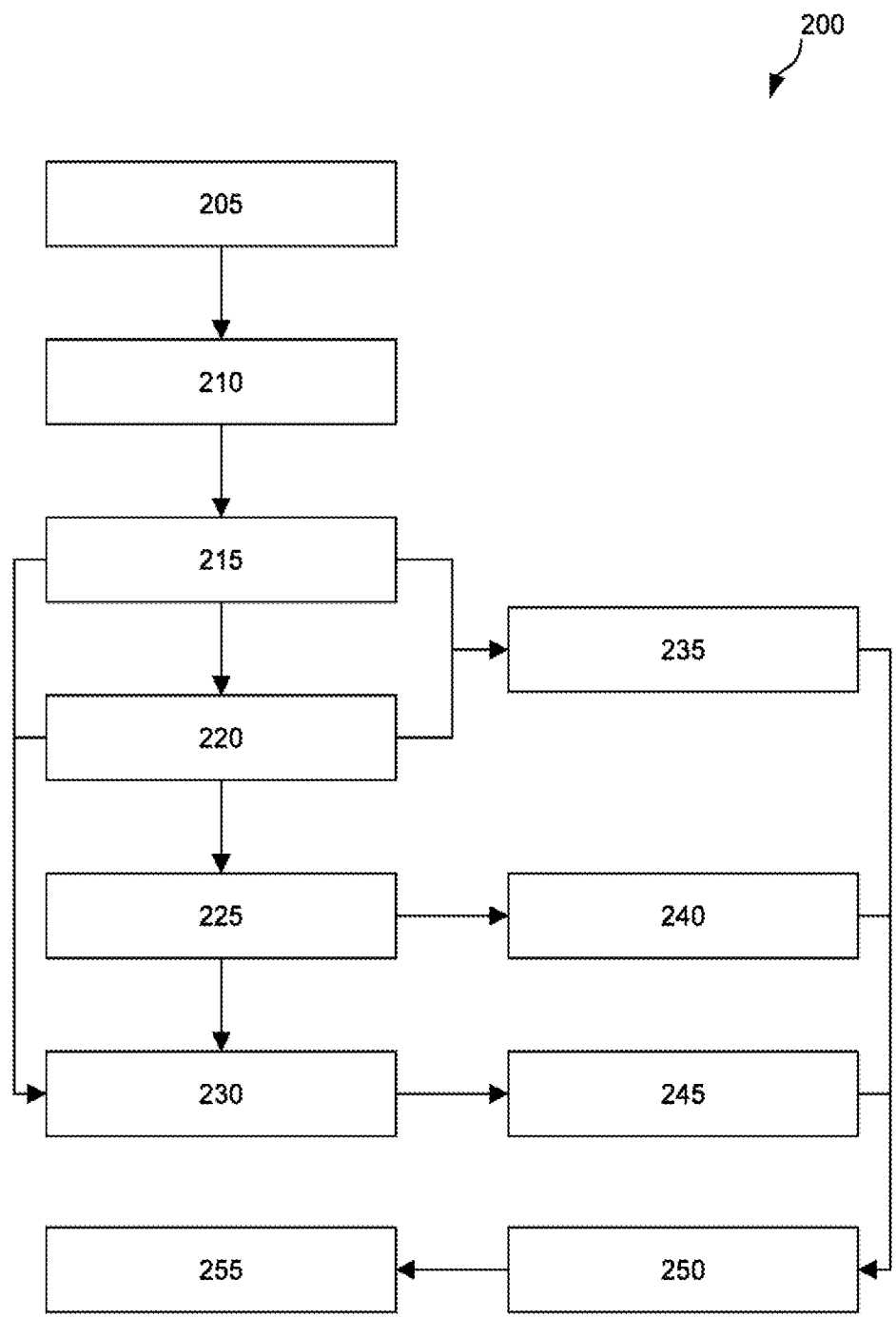
FIG. 2 illustrates a flow chart of a method.

FIG. 2 shows a flowchart of a method 200 for determining travel information on board a vehicle 105. A sequence of the process steps is not mandatory; moreover, in further embodiments, one or more of the specified steps may be omitted.

In a first step 205, a geographic location of the vehicle 105 may be determined. This location may be used as starting point 115 in the following. In a step 210, the destination point 120 may be determined. For this purpose, a person on board the vehicle 105, such as a driver, may specify the destination point 120.

In a step 215, a time at which travel of the vehicle 105 on the route 100 is to occur may optionally be determined. In various embodiments, a start time may be specified at which the journey begins at the starting point 115, a destination time at which the journey is to end at the destination point 120, or an intermediate time at which one of the intermediate points 125 is to be passed. Optionally, a planned stop at one of the intermediate points 125 may also be determined. The specified times and points may be taken into account accordingly in the following.

In addition, the route 100 may be determined in step 215. In particular, it is possible to determine which segments of which roads are combined to form route segments 130. The determined route 100 comprises a solution to a navigation problem between the starting point 115 and the destination point 120 on a predetermined road network. The way in which individual road segments are grouped into route segments 130 may be freely selected. Typically, the goal is segmentation in which conditions are essentially constant when traveling a route segment 130. Such conditions may comprise for example a road class, a maximum allowable speed, a traffic flow, and/or a road designation.

In a step 220, past or historical traffic flows may be determined for individual route segments 130 of the route 100. For this purpose, current messages about traffic flows or traffic obstructions may be received for example by means of RDS or TMC. Further information may be requested for example from an external entity via the communication interface 165.

In a step 225, a current traffic flow on the route 100 may be determined. For this purpose, current traffic information may be determined. In a step 230, a traffic flow on a route segment 130 may be predicted. The prediction may relate to a predetermined time horizon, which may be determined on the basis of a time at which the vehicle 105 is expected to travel the route segment 130. The prediction of the traffic flow may take place locally by the apparatus 110 or remotely by the external entity.

In a step 235, a usual travel time may be determined on the basis of the determined route 100. The usual travel time may be determined using average traffic flow information stored in the map memory 170 and/or taking historical traffic flows from step 220 into account. This determination may be made by the apparatus 110 or the external device that is contactable by means of the communication interface 165.

In a step 240, a current travel time may be determined by the apparatus 110 or the external entity on the basis of the determined current traffic flow. The current travel time is a theoretical value indicating how long it would take the vehicle 105 to travel the distance between the starting point 115 and the destination point 120 on the route 100 if currently valid traffic flows on the route segments 130 included in the route 100 were not to change while traveling on said segments. This corresponds to a travel time that results if it is assumed that the vehicle 105 is simultaneously at all locations along the route 100.

In a step 245, a travel time may be predicted on the basis of the predicted traffic flow. It is also alternatively possible for the apparatus 110 or the external entity to make this determination. The predicted travel time corresponds as realistically as possible to the time difference between the departure of the vehicle 105 at the starting point 115 and the arrival at the destination point 120 under the selected conditions. Predicted travel times may also be determined with respect to a single route segment 130 or segments of several adjacent route segments 130.

In a step 250, two deviations are preferably determined. A first deviation is between the predicted travel time and the usual travel time, and a second deviation is between the predicted travel time and the current travel time. One or both deviations may then be quantized by determining in which of several predetermined segments the particular value falls.

In a step 255, the particular travel information may be provided. In particular, the information may be provided on board the vehicle 105, and preferably to a driver of the vehicle 105. The output is preferably visual and in particular graphical with respect to a representation of the route 100. Distances, travel times, or deviations may be provided with respect to the entire route 100, a route segment 130, or several route segments 130. In particular, the graphical representation may be based on a map representation of the route 100 or a segment thereof, or a linearized representation of the route 100 or a segment thereof.

REFERENCE CHARACTERS

100 Route
105 Vehicle
110 Apparatus
115 Starting point
120 Destination point
125 Intermediate point
130 Route segment
150 Processing device
155 Output device
160 Positioning device
165 Communication interface
170 Card memory
200 Method
205 Determine location
210 Determine destination point
215 Determine route
220 Determine historical traffic flows
225 Determine current traffic flow
230 Predict traffic flow
235 Determine usual travel time
240 Determine current travel time
245 Determine predicted travel time
250 Determine deviations
255 Provide travel information

The invention claimed is:

1. A method for determining travel information of a vehicle on a predetermined route, the method comprising:
receiving satellite signals at a navigation system of the vehicle while the vehicle is in motion, the satellite signals indicating a geographic position of the vehicle;
dividing a route into route segments;
determining a usual travel time on the route with respect to at least one of the route segments;
determining a current travel time on the route based at least in part on a current traffic flow on the route, wherein the current travel time is determined with respect to at least one of the route segments;
determining a predicted travel time based at least in part on a traffic flow on the route at a time at which the vehicle is expected to travel on said route, wherein the predicted travel time is determined with respect to at least one of the route segments;
providing a deviation of the predicted travel time from the usual travel time, wherein deviations of the predicted travel time from the usual travel time with respect to a plurality of adjacent route segments are summed and provided; and
providing a deviation of the predicted travel time from the current travel time on an output device of the vehicle while the vehicle is in motion, wherein the deviation of the predicted travel time from the current travel time is expressed as a real-time trend of traffic flow on the output device of the vehicle, wherein the trend includes one of an increasing travel time, a decreasing travel time, and a constant travel time, and wherein deviations of the predicted travel time from the current travel time with respect to the plurality of adjacent route segments are summed and provided.

2. The method as claimed in claim 1, further comprising providing the deviation of the predicted travel time from the usual travel time and the deviation of the predicted travel time from the current travel time with respect to an associated segment.

3. The method as claimed in claim 1, wherein an indication of a deviation between the usual travel time and the current travel time on one of the route segments is provided.

4. The method as claimed in claim 3, further comprising causing a display to provide a graphical representation of the route and an indication of the deviation between the usual travel time and the current travel time with respect to a route segment at a corresponding segment of the graphical representation.

5. The method as claimed in claim 4, further comprising providing the indication by using a scale of colors.

6. The method as claimed in claim 5, wherein the graphical representation comprises a one-dimensional route.

7. The method as claimed in claim 4, wherein the graphical representation comprises a one-dimensional route.

8. The method as claimed in claim 1, wherein the predicted travel time is determined based at least in part on the current traffic flow, an expected traffic flow, and/or a previously determined traffic flow.

9. The method as claimed in claim 8, wherein the expected traffic flow within a predetermined time horizon is determined at least in part using Markov chains.

10. The method as claimed in claim 1, wherein the route is determined as a function of the predicted travel time.

11. The method as claimed in claim 1, further comprising:
determining a further usual travel time on a further route;
determining a further current travel time on the further route based at least in part on the current traffic flow on the further route;
determining a further predicted travel time based at least in part on a further traffic flow on the further route at the time at which the vehicle is expected to travel on said further route;
obtaining information indicative that a person on board is familiar with an area associated with the further route; and
providing an absolute travel time responsive to information indicative that the person on board the vehicle is familiar with the area.

12. The method as claimed in claim 1 further comprising controlling the vehicle based at least in part on the trend of traffic flow.

13. A vehicle comprising an apparatus for determining travel information of a vehicle on a predetermined route, wherein the apparatus comprises:
a processing device configured to:
determine a usual travel time on a route based at least in part on satellite signals indicating a geographic position of the vehicle while in motion;
determine a current travel time on the route based at least in part on a current traffic flow on the route; and
determine a predicted travel time based at least in part on a traffic flow on the route at a time at which the vehicle is expected to travel said route; and
an output device configured to provide a deviation of the predicted travel time from the usual travel time, and a deviation of the predicted travel time from the current travel time, wherein the deviation of the predicted travel time from the current travel time is expressed as a real-time trend of traffic flow on the output device, wherein the trend includes one of an increasing travel time, a decreasing travel time, and a constant travel time, and wherein deviations of the predicted travel time from the current travel time with respect to the plurality of adjacent route segments are summed and provided.

14. The apparatus as claimed in claim 13, further comprising a first device for determining a current position, and a second device for determining a predetermined target position, wherein the processing device is configured to determine the route based at least in part on the current position and a target position.

15. The apparatus as claimed in claim 13, wherein the output device includes a display configured to provide an audio and/or visible indication of the deviation of the predicted travel time from the usual travel time, and the deviation of the predicted travel time from the current travel time.

16. A method for determining travel information of a vehicle on a predetermined route, wherein the method comprising:
determining a usual travel time on a route;
determining a current travel time on the route based at least in part on a current traffic flow on the route;
determining a predicted travel time based at least in part on a traffic flow on the route at a time at which the vehicle is expected to travel on said route;
using a processing device to determine a deviation of the predicted travel time from the usual travel time;
using the processing device to determine a deviation of the predicted travel time from the current travel time; and
causing a display within the vehicle to provide an audio and/or visible indication of the deviation of the predicted travel time from the usual travel time, and the deviation of the predicted travel time from the current travel time, wherein the deviation of the predicted travel time from the current travel time is expressed as a real-time trend of traffic flow on the output device, and wherein deviations of the predicted travel time from the current travel time with respect to the plurality of adjacent route segments are summed and provided.

17. The method as claimed in claim 16, further comprising:
dividing the route into route segments;
determining the current traffic flow, the current travel time, and the predicted travel time with respect to at least one of the route segments; and
causing the display to provide a graphical representation of the route and an indication of a deviation of the predicted travel time from the current travel time with respect to a route segment at a corresponding segment of the graphical representation.

18. The method as claimed in claim 17, further comprising providing the indication by using a scale of colors.

19. The method of claim 16 further comprising controlling the vehicle based at least in part on the trend of traffic flow.

* * * * *